United States Patent
Sachs

[19]

[11] Patent Number: 5,992,349
[45] Date of Patent: Nov. 30, 1999

[54] ANIMAL FEEDER

[76] Inventor: Thomas D. Sachs, W8561 CTH Q, Watertown, Wis. 53098

[21] Appl. No.: 09/033,814

[22] Filed: Mar. 3, 1998

[51] Int. Cl.[6] ............................ A01K 5/01; A01K 39/014
[52] U.S. Cl. .......................... 119/52.1; 119/53.5; 119/54; 119/902
[58] Field of Search .......................... 119/52.1, 53, 53.5, 119/54, 51.11, 902

[56] References Cited

U.S. PATENT DOCUMENTS

| | | | |
|---|---|---|---|
| 361,621 | 4/1887 | Ferguson | 119/54 |
| 716,743 | 12/1902 | McHenry et al. | 119/54 |
| 845,982 | 3/1907 | Smith | 119/53.5 |
| 893,623 | 7/1908 | Groh | 119/53 |
| 1,398,041 | 11/1921 | Pfeifer | 119/52.1 |
| 1,398,179 | 11/1921 | Dierks | 119/54 |
| 4,432,304 | 2/1984 | Johnson | 119/477 |

FOREIGN PATENT DOCUMENTS 1507076  4/1969  Germany ................................. 119/54

*Primary Examiner*—Thomas Price
*Assistant Examiner*—Son T. Nguyen
*Attorney, Agent, or Firm*—Quarles & Brady LLP

[57] ABSTRACT

The present invention provides an animal feeder comprising a hopper and a feed tray into which feed is gravity fed from the hopper. The hopper has an inverse funnel shape to prevent feed jams. The feeder is formed from two halves with a metering gate that meters the feed fed from the hopper to the tray. The metering gate has a limited swing with pegs mounted thereon to further agitate jammed feed inside the hopper as the animal feeds from the tray.

12 Claims, 4 Drawing Sheets

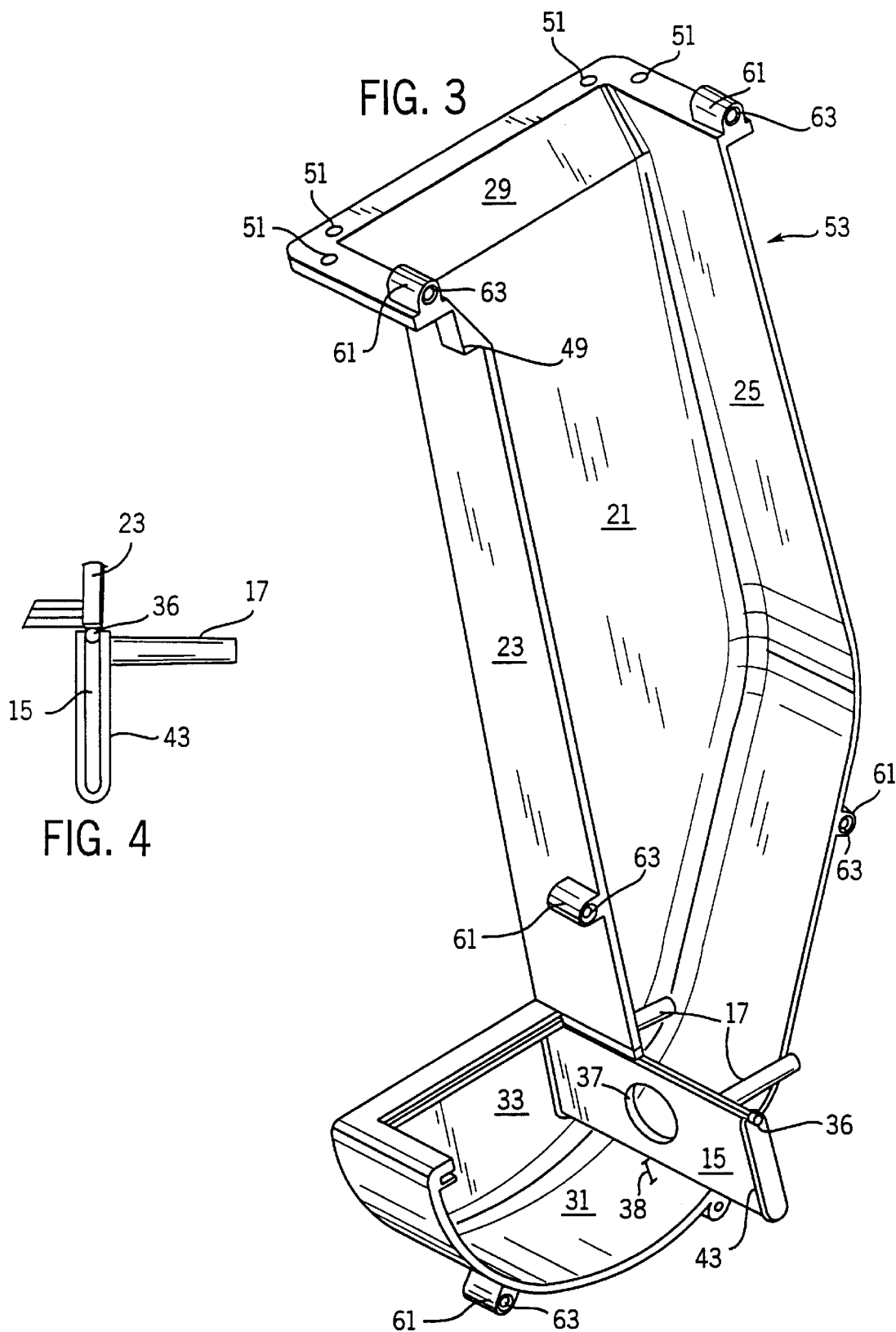

ANIMAL FEEDER

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of invention is animal feeders, more particularly animal feeders for dry feed material for small animals.

Domesticated and caged animals require feeding at regular intervals. Manually filling a dish with food on a regular basis can be inconvenient and in the case of caged animals may require opening the cage providing the animal with the opportunity to escape or injure the attendant.

Known feeders that accommodate such circumstances are gravity animal feeders. These feeders normally are composed of a hopper in which the feed is stored. An opening in the bottom of the hopper allows feed to flow with the aid of gravity into a dish from which the animal feeds. The hopper can extend outside of a cage for refilling without opening the cage. Such feeders are particularly useful for supplying animals with dry granular or pelletized feed.

Prior feeders of this type tend to have metering gates disposed between the hopper and the dish to prevent too much feed from filling the dish at one time. These gates are often nudged by the feeding animals to a position limiting their usefulness. Additionally, feed can get jammed in the hopper preventing the gravity flow of feed into the dish.

The construction of prior feeders tend to be unduly complicated requiring the assembly of the hopper to the dish portion. In larger gravity feeder used in commercial applications, such as in the fur industry, assembly of the feeders is cumbersome and expensive.

The present invention is directed to overcoming one or more of the above.

BRIEF SUMMARY OF THE INVENTION

The present invention provides an animal feeder comprising a hopper and a feed tray into which feed is gravity fed from the hopper. The feeder is formed from two halves with a metering gate that meters the feed fed from the hopper to the tray. Thus accomplishing a general objective to provide an animal feeder that is easy to assemble.

Another objective of the present invention is to provide an animal feeder metering gate that cannot be nudged into an inoperative position by a feeding animal. This is accomplished by providing a metering gate with a limited swing.

Still another objective of the present invention is to provide an animal feeder that is not prone to feed jams in the hopper. This is accomplished by providing a hopper that is wider at the bottom than at the top.

Yet another objective of the present invention is to provide a mechanism that dislodges feed jams if they occur. This is accomplished by providing an agitation mechanism mounted on the metering gate which dislodges feed jammed in the hopper.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 3 is a view of a half of the feeder of FIG. 1;

FIG. 4 is a side view of the meter gate of FIG. 1; and

DETAILED DESCRIPTION OF THE PREFERRED EMBODIMENTS

Figure 1:
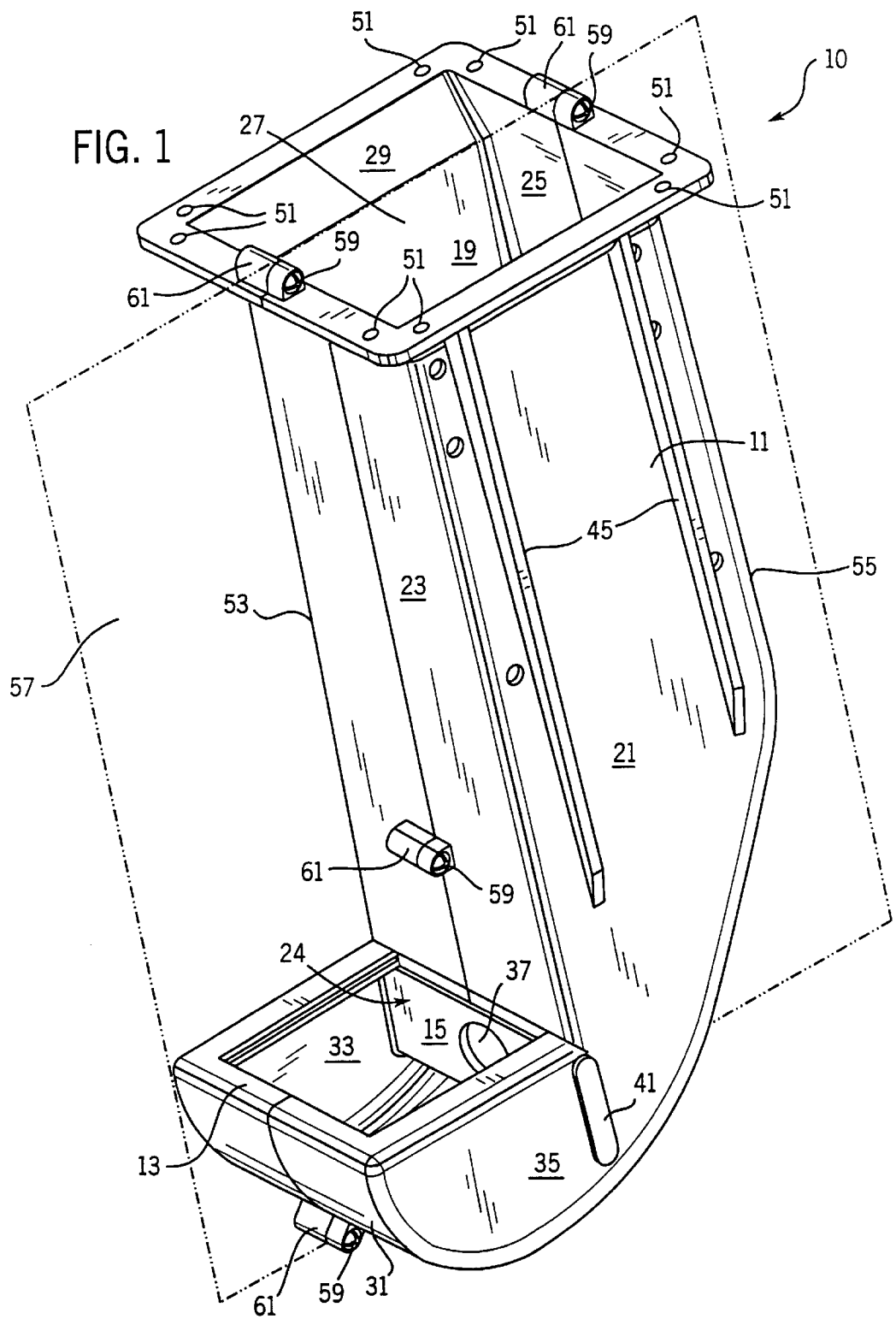
FIG. 1 is a perspective view of a feeder according to the present invention looking from the front and side.

An embodiment of the invention as shown in FIG. 1 is an animal feeder 10 comprising a hopper 11 and a feed tray 13 into which feed is gravity fed from the hopper 11. A metering gate 15 meters the feed fed from the hopper 11 to the tray 13. Pegs 17 formed part of the metering gate 15, shown in FIGS. 3 and 4, dislodges feed jammed in the hopper 11.

As shown in FIGS. 1–3 and 5, the hopper 11 has opposing sidewalls 19, 21 interconnected by a front wall 23 and a rear wall 25. The hopper top 27 is open allowing the user to fill the hopper 11 with animal feed. A removable cover 29 may be placed over the filled hopper 11 to protect the feed from insects or the like. The front wall 23 has an opening 24 that interconnects the hopper 11 with the feed tray 13. The hopper front wall 23 and sidewalls 19, 21 are substantially vertical with a flare 29 at the hopper top for easy filling of feed. The rear wall 25 extends outwardly and downwardly from the top 27 for a distance forming an inverse funnel shape. This inverse funnel shape prevents feed from jamming in the hopper 11. Near the hopper bottom, the rear wall 25 turns inwardly and downwardly to guide the feed into the feed tray 13 through the opening 24 in the front wall 23.

The feed tray 13 has a bottom wall 31 interconnected by a pair of opposing sidewalls 33, 35. The bottom wall 31 extends forwardly from the hopper rear wall 25 forming the tray 13 from which an animal can feed. Corners 37 formed by the intersection of the feed tray bottom wall 31 and sidewalls 33, 35 are rounded to allow easy cleaning by animals as they feed.

A generally rectangular gate 15 swingably mounted to the hopper sidewalls 19, 21 is interposed between the hopper 11 and the feed tray 13. The gate 15 is swingably mounted to the hopper sidewalls 19, 21 by outwardly extending pins 36 formed at each gate end. The pins 36 extend into holes 40 formed in each hopper sidewall 19, 21, thus suspending the gate 15 between the hopper 11 and the feed tray 13. A hole 37 in the gate 15 encourages the animal to nudge the gate 15 with its nose in an attempt to get feed. The feed flows from the hopper 11 into the feed tray beneath the gate 15 through a gap 38, shown in FIG. 3, between the gate 15 and the hopper rear wall 25. The size of the gap 38 determines the amount of feed entering the feed tray 13. The bottom of the gate 15 is also rounded to allow easy cleaning by animals as they feed.

Each slot 39, 41 formed in the hopper sidewalls 19, 21 receives a gate end, and limits the gate swing. The limited gate swing prevents the gate 15 from being pushed too far into the hopper 11 by an animal, or to far out of the hopper 11 by the flowing feed. Limiting the gate swing limits the feed exiting the hopper 11 underneath the gate 15 formed in the hopper sidewalls 19, 21 limit the gate swing to prevent the gate 15 from being pushed too far into the hopper 11 by an animal or out of the hopper 11 by the flowing feed allowing feed to exit the hopper 11 underneath the gate 15.

The slots 39, 41 limit the gate swing to a swing range of less than 10 degrees. Flanges 43 formed in the gate cover the slots 39, 41 preventing clogging by the feed lodging in the slots 39, 41.

Looking particularly at FIG. 4, the gate 15 also serves as an agitation mechanism for an animal to dislodge feed jammed inside the hopper 11. If feed jams inside the hopper 11, the animal nudges the gate 15, pushing feed in the hopper behind the gate back into the hopper 11. The reverse movement of the feed dislodges jammed feed further up in the hopper 11. Preferably, pegs 17 mounted on the hopper side of the gate 15 extend into the feed to provide additional movement of the feed in the hopper 11 further dislodging any jammed feed as the gate 15 swings.

Ribs 45 on the hopper sidewalls 19, 21 provide structural stiffening support for the hopper 11 and maintains squareness when the feeder 10 is mounted to the side of an animal enclosure. The ribs 45 also provide structural support for a flange 47 at the hopper top 27. The flange 47 supports the feeder 10 in drop in applications for existing animal enclosure openings. A stop block 49 formed in the flange 47 on the hopper front wall 23 maintains squareness when the feeder is mounted to the outside of an animal pen. Tie holes 51 spaced along the flange 47 provide attachment points for tags and the like.

The feeder 10 is assembled from two plastic molded halves 53, 55 that are generally symmetrical about a central plane 57. The plane 57 vertically bisects the hopper 11 and the feed tray 13. The halves 53, 55 are joined by six self tapping stainless steel screws 59 threadably inserted into a like number of screw bosses 61. A half of each screw boss 61 is correspondingly located along the central plane 57 on each half 53, 55 of the feeder 10. Locating rings 63 on one half of each screw boss 61 receives the corresponding half of the screw boss 61 thus aligning the feeder halves 53, 55 for easy assembly.

Figure 2:
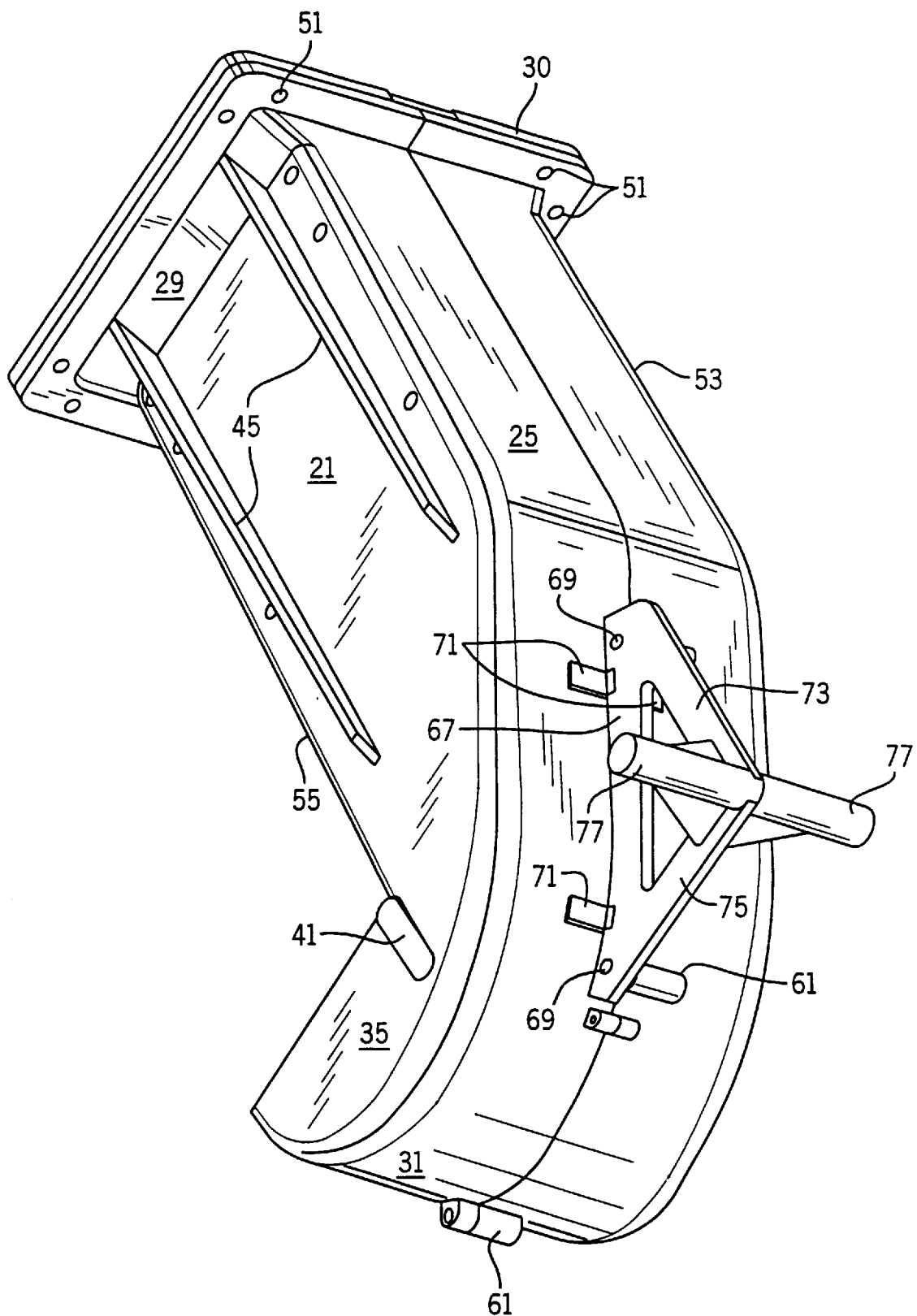
FIG. 2 is a perspective view of the feeder of FIG. 1 with a stand attached looking from the bottom and rear.
Figure 5:
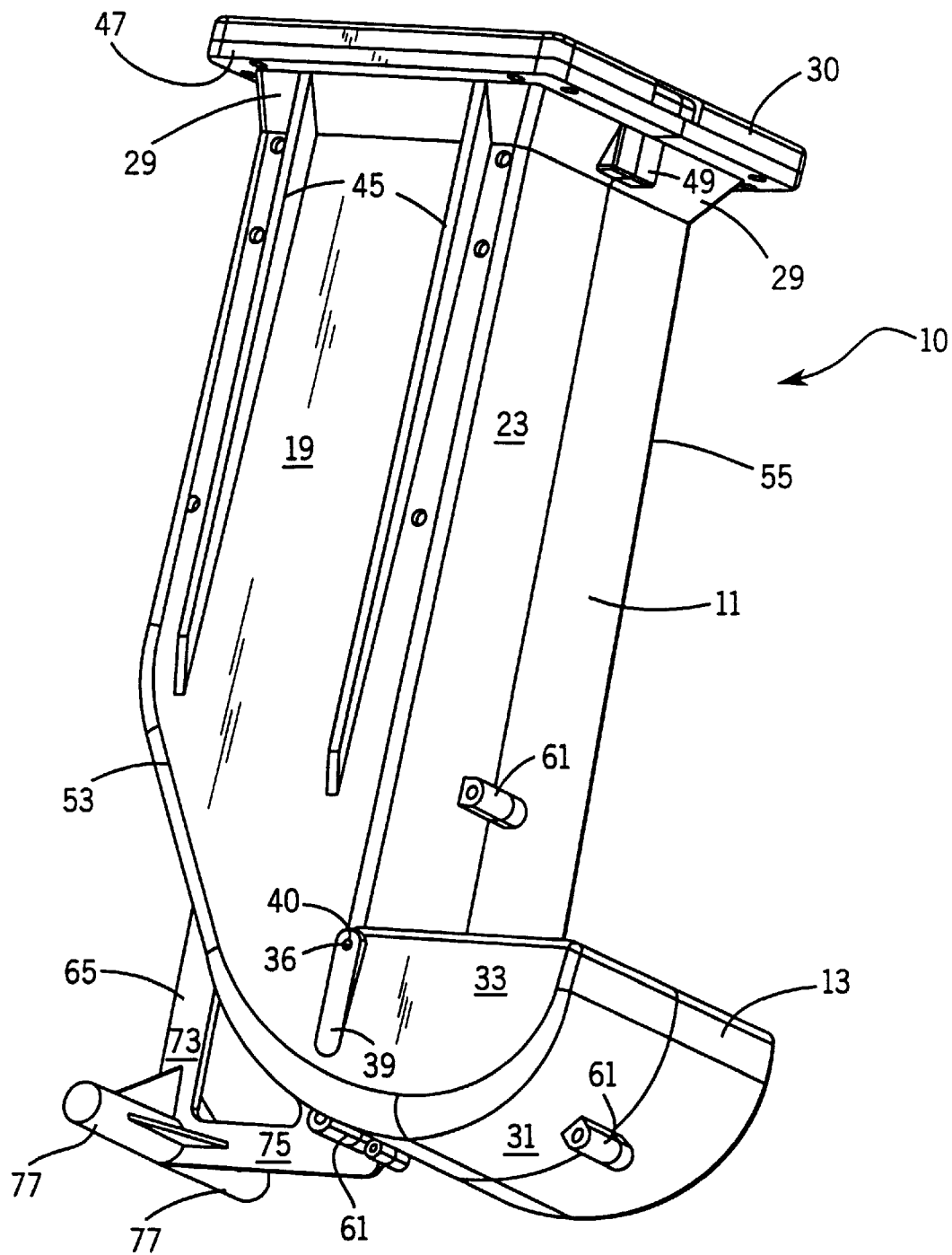
FIG. 5 is a perspective view of the feeder of FIG. 1 with a stand looking from the front and side.

As shown in FIGS. 2 and 5, a removable stand 65 mounted to the hopper rear wall 25 provides stability for stand alone use. The stand 65 is generally triangular shaped having three sides. A first side 67 is formed to conform with the hopper rear wall 25. Two stand mounting holes 69 in the first side 67 are aligned with existing screw bosses 61 for mounting. The stainless steel screws 59 used for joining the feeder halves 53, 55 are inserted into the stand mounting holes 69 prior to being threadably inserted into the corresponding screw boss 61. Lateral opposing extensions 71 spaced along the first side 67 of the stand 65 provide lateral stability for the stand 65 and the feeder 10.

Second and third sides 73, 75 of the stand 65 extend from each end of the first side 67 intersecting to form the triangular shape of the stand 65. A pair of laterally opposing cylindrical extensions 77 extend from the intersection point of the second and third sides 73, 75 to provide stability for the feeder 10.

In use, dry pelletized feed is poured into the open top 27 of the hopper 11. The feed flows by gravity toward the feed tray 13 of the feeder 10. The metering gate 15 meters the amount of feed entering the feed tray 13. As an animal consumes the feed, continuous nudging of the metering gate 15 by the feeding animal ensures a continuous supply of feed, but at a small constant flow as a result of the small arc of movement. If the feed becomes jammed inside the hopper 11, this nudging pushes the agitator pegs 17 further into the jammed feed, thus breaking up the jam.

While there has been shown and described what are at present considered the preferred embodiment of the invention, it will be obvious to those skilled in the art that various changes and modifications can be made therein without departing from the scope of the invention defined by the appended claims.

I claim:

1. An animal feeder comprising:

a feed hopper having sidewalls, a front wall, a rear wall, and an open top, said front wall having an opening;

a feed tray in communication with said hopper through said opening; and a feed agitator mechanism mounted in said opening for movement through a limited arc, wherein an animal nudges said mechanism feed agitator to loosen feed in said hopper, and cause said feed to fall into said tray, wherein said feed agitator mechanism movement is limited by slots formed in said hopper sidewalls, and said feed agitator mechanism has flanges covering said slots.

2. An animal feeder as in claim 1, wherein said feed agitator mechanism is a gate having an interior side and an exterior side, said interior side having knockdown pegs mounted thereon.

3. An animal feeder as in claim 1, wherein said feed agitator mechanism is a gate having a hole, wherein said tray is in communication with said hopper allowing an animal to see said feed in said hopper.

4. An animal feeder as in claim 1, wherein a portion of said hopper forms an inverse funnel.

5. An animal feeder as in claim 1, wherein said feeder is formed from two halves joined together.

6. An animal feeder as in claim 1 further comprising a stand mounted to said feeder.

7. An animal feeder comprising:

a first half;

a second half that is generally symmetrical about a central plane with said first half, said halves being joined at said central plane wherein said joined halves form a hopper and a feed tray, said feed tray being in communication with said hopper; and a swingably suspended meter gate interposed between said hopper and said feed tray, said gate having a limited swing, wherein said gate swing is limited by slots formed in said feeder halves that are engaged by side of the gate.

8. An animal feeder as in claim 7 wherein said hopper forms an inverse funnel.

9. An animal feeder as in claim 7 further comprising a stand mounted to said feeder.

10. An animal feeder comprising:

a first half;

a second half that is generally symmetrical about a central plane with said first half, said halves being joined at said central plane wherein said joined halves form a hopper and a feed tray, said feed tray being in communication with said hopper; and a swingably suspended feed agitator mechanism interposed between said hopper and said feed tray, wherein an animal nudges said mechanism loosening feed in said hopper causing said feed to fall into said tray, wherein said mechanism has a swing limited by slots formed in said feeder halves.

11. An animal feeder as in claim 10 wherein said feed agitator mechanism is a meter gate with pegs mounted thereon, said gate being interposed between said hopper and said feed tray.

12. An animal feeder as in claim 10 further comprising a stand mounted to said feeder.

* * * * *

UNITED STATES PATENT AND TRADEMARK OFFICE
CERTIFICATE OF CORRECTION

Patent No.   : 5,992,349
Dated        : November 30, 1999
Inventor(s)  : Thomas D. Sachs It is certified that error appears in the above-identified patent and that said Letters Patent is hereby corrected as shown below:

Column 2, line 39, "Corners 37 formed" should be --Corners formed--.

Delete the partial sentence in Column 2, line 63, beginning with, "formed in" and ending on line 67 with "the gate 15".

Column 4, Claim 7, line 42, "side" should be --sides--.

Signed and Sealed this

Twenty-seventh Day of March, 2001

*Attest:*

NICHOLAS P. GODICI

*Attesting Officer*     *Acting Director of the United States Patent and Trademark Office*